Patented Apr. 24, 1951

2,549,856

UNITED STATES PATENT OFFICE 2,549,856

MUSTARD GAS-RESISTANT PAINT

Harry Scherr, Baltimore, and Glenn A. Little, Bel Air, Md., assignors to the United States of America as represented by the Secretary of War No Drawing. Application June 8, 1944, Serial No. 539,370

1 Claim. (Cl. 260—15)

(Granted under the act of March 3, 1883, as amended April 30, 1928; 370 O. G. 757)

The invention described herein may be manufactured and used by or for the Government, for governmental purposes, without the payment to us of any royalty thereon.

This invention relates to a paint which is resistant to bis (beta chlorethyl) sulfide, commonly known as mustard gas.

Mustard gas is a very persistent compound, and surfaces contaminated therewith constitute a hazard to personnel after long periods of exposure to weather. This is due to the fact that mustard gas readily penetrates many substances and remains vesicant. Decontaminating compounds are known which will react with mustard gas to render it non-vesicant, but such decontaminating compounds cannot penetrate the various surfaces. However, if the mustard gas can be prevented from penetrating surfaces, the known decontaminating compounds can be used successfully. Therefore, the mustard gas resistant paint as herein contemplated is one which forms a surface seal which is not penetrated by gaseous or liquid mustard gas, and which itself is not attacked by mustard gas.

It is the object of this invention to provide a paint which is resistant to mustard gas, which is non-toxic and non-corrosive, which will withstand the action of decontaminating agents and the solvents employed with them, and which may be applied to ship decks and other exposed surfaces of aircraft, on mustard gas plant-filling equipment, and to other surfaces which are liable to be exposed to mustard gas. Included within the scope of surfaces which may be protected are the above mentioned surfaces, clothing, and the skin.

Among the requirements for such a paint are the following:

a. It must produce a film substantially impervious to mustard gas, b. It must be applicable to wood, metal or concrete.

c. It must be relatively inexpensive, d. It must produce a film resistant to wear, e. It must be capable of being colored for camouflage purposes or serve as a base for a colored coat, f. It must be capable of application by semi-skilled labor, g. It should preferably comprise only ingredients readily available in commercial quantities in the United States, h. It should be unharmed by the application of the standard de-mustardizing agent.

Experiments have been made over a period of time with many substances as possible ingredients for a mustard gas-resistant paint. The ordinary commercial paints are not sufficiently resistant to mustard gas because they contain large percentages of materials having low resistance to penetration by mustard gas.

Paints having a base of nitrocellulose have been tried. A description of some compositions which have a base of nitrocellulose and which have been tested, follows:

Mixtures of nitrocellulose and a chlorinated naphthalene, and mixtures of nitrocellulose and stearic acid have been prepared. The former mixtures were found to be incompatible and separated in the film. The latter mixtures had good physical properties and the addition of stearic acid greatly reduced the flammability of the nitrocellulose.

In general, nitrocellulose lacquer films have been found to be highly resistant to mustard gas. However, the films showed poor adhesiveness and extreme brittleness. Several materials have been added in an effort to overcome these deficiencies. Aluminum stearate added to nitrocellulose lacquer showed some promise in the desired direction, but it can be used only in very limited amounts in the film since it separates as a thin surface layer, showing up as white spots when the film is rubber.

Several other mixtures have been prepared, utilizing tung oil, castor oil, and tricresyl phosphate as plasticizers for nitrocellulose. When these materials have been used in amounts necessary to exert a beneficial effect on the film, as far as improving adhesiveness and reducing brittleness are concerned, the resistance to mustard gas has been considerably reduced. Poor results have also been obtained in this connection when attempts were made to use manganese linoleate in the nitrocellulose lacquers.

A mixture of stearic acid and zinc oxide in varying proportions was then tried as a plasticizing agent for nitrocellulose, with fairly satisfactory results.

Paraffin was not satisfactory. Various other plasticizers for nitrocellulose were then tried in the nitrocellulose-base paints. Among these were tricresyl phosphate, a glyptal resin and castor oil.

Not only were nitrocellulose-containing paints tried as mustard gas-resistant paints, but also paints not containing nitrocellulose were also tried in this connection.

Among mustard-resistant paint mixtures which do not have nitrocellulose as one of their ingredients is a composition comprising:

1 part rubber hydrochloride
5 parts zinc oxide
15 parts chlorinated coal tar naphtha, and
15 parts sym dichlor-bis (2,4,6 trichlorphenyl) urea This composition was not satisfactory from a standpoint of resistance to mustard gas. Another paint comprising sym-dichlor-bis (2,4,6 trichlorphenyl) urea, soap and water rubbed off too easily for practical purposes. Glue, casein and sodium silicate were each tried as binders in the latter composition, but were not suitable since the sym dichlor-bis (2,4,6 trichlorphenyl) urea reacted with each of these substances—with the glue more slowly than with the others.

An attempt to prepare a coating impervious to mustard gas was made, using sodium silicate. Tests showed that sodium silicate forms a gas-proof film when freshly applied, but that it quickly deteriorates and becomes porous due to the chemical and physical changes which occur on contact with the atmosphere. Sodium silicate cannot therefore be recommended for use as a film for sealing in and for excluding toxic gases except as a temporary measure.

Varnishes, asphaltic cements, rubber and phenol-formaldehyde resins were found to be generally attacked by mustard gas. The gums, resins and oils used in the majority of commercial paints and lacquers were found not to be resistant to mustard gas. A combination of asphalt and tung oil, as well as a mixture consisting of the following: 3 parts by weight of sodium silico fluoride, 1 part by weight of zinc silico fluoride, using two pounds of the above mixture per gallon of water, was tried without success.

Asphalt has been tried, but has been indicated as not suitable either as an emulsion or as a base of a paint. It is not resistant to penetration of mustard gas, and renders the surface to which it is applied difficult to decontaminate. Paraffin wax, aluminum stearate, and stearic acid have also been tried in paints, both singly and in all combinations, but the wearing qualities of the resutling paints have not been satisfactory. Creosote was found to have dubious value as a mustard gas-resistant paint. Hot sulfur plastics have been sprayed on concrete, but this process has been developed too recently to determine its value as a mustard-resistant paint.

A summary of the behavior of various single substances toward liquid mustard gas follows:

TABLE I

*Effect of mustard gas (liquid and vapor) on commercial paints and synthetic resins*

A paint comprising spar varnish and zinc oxide: Severe swelling and detachment of film at several points within two hours.
A nitrocellulose solution: No change after 120 hours.
A chlorinated-rubber paint: Attacked at once. In 15 minutes film removed from test piece.
A dispersion of thiokol in ethylene dichloride: Film completely removed in 24 hours.
A paint comprising glyceryl phthalate, China-wood oil, linseed oil and an oil modified glyceryl phthalate resin: Badly attacked. Film swelled and blistered after 24 hours.
Solid chlorinated rubber: After only 1 hour film completely dissolved.
Varnish of phenol-formaldehyde resin and tung oil: Film attacked at once. Severe swelling and detachment. In 18 hours film completely disintegrated, softened and easily rubbed off.
Solid phenol-formaldehyde resin: In 18 hours entire film dissolved.
An acrylic ester: In 18 hours entire film dissolved.
Rosin-tung oil varnish: In 18 hours film swelled, softened and easily detached.
A chlorinated rubber pigmented paint: Film completely dissolved in about 15 minutes.
A urea-aldehyde resin: No change after 96 hours.

This invention overcomes the above disadvantages, and comprises broadly a paint comprising a mixture of a cellulose ester and a urea-aldehyde resin. Either cellulose acetate or cellulose nitrate can be used as the cellulose ester. Any urea-aldehyde resin which is compatible with the cellulose ester can be used. When these materials are formulated into a paint, preferably to an extent where they form the major portion of the dried film, together with pigments and plasticizing agents within definite limits, a film from such paint exhibits marked resistance against mustard gas, both in the liquid and vapor state. The optimum percentage of the mixture cellulose ester and urea-aldehyde resin is about 60% of the dried film.

Vesicant tests on men, using films from paints comprising a mixture of a cellulose ester and a urea-aldehyde, wherein the urea-aldehyde resin is compatible with the cellulose ester, gave negative results—that is, no burns were obtained on the skin. The experiments to determine resistance in terms of vesicant action on men included applying the paint to panels, then spraying liquid mustard gas to the panels, and then removing as much of the liquid mustard gas as would be removed by ordinary decontaminating means. After the decontaminating procedure, test samples of cloth were applied to the decontaminated panels, and were then applied to the forearms of men for a period of six hours.

The outstanding advantage of the paints comprising mixtures of esters of cellulose and urea-aldehyde resins is that they prevent mustard gas from seeping into a surface protected with the paints. A further advantage of these mustard gas-resistant coatings is that they withstand the action of decontaminating agents and the solvents employed with them. These paints will be of value in protecting decks and other exposed surfaces on shipboard; on mustard gas plant-filling equipment and on the exposed surfaces of aircraft.

More specifically, the invention includes in its scope the paint compositions tabulated below:

TABLE 2

| | Paint Number | |
|---|---|---|
| | 228 | 230 |
| Components | Per cent | Per cent |
| Nitrocellulose (dry basis) | 9.5 | 8.0 |
| A urea-aldehyde resin | 4.8 | 5.0 |
| An aromatic amide-aldehyde resin | 2.4 | 3.9 |
| Tricresyl phosphate | 1.7 | 2.5 |
| Titanium dioxide containing 8% titanium phthalate | 2.4 | 2.5 |
| Zinc Oxide | 1.7 | 1.8 |
| Lampblack | 0.2 | 0.2 |
| Aluminum powder | 1.2 | 1.3 |
| Solvent (as below) | 76.1 | 74.8 |
| Total | 100.0 | 100.0 |
| *Solvent composition (per cent by weight)* | | |
| Ethyl acetate | 18.8 | 16.1 |
| Toluene | 18.8 | 16.1 |
| Cellosolve | 11.3 | 12.2 |
| Cellosolve acetate | 18.6 | 20.4 |
| Butyl Cellosolve | 9.4 | 10.2 |
| Butyl alcohol | 7.5 | 8.1 |
| Turpentine | 15.6 | 16.9 |
| Total | 100.0 | 100.0 |

These two formulas, numbered 228 and 230, give paints of excellent brushing and leveling properties, producing films that were dry to the touch in from one to two hours, and very hard in about one day. The films had only a slight gloss. The formulas contain a solvent balance that showed in tests to have high antiblushing qualities, making it possible to use the paints in atmospheres of very high humidities.

Vesicant tests on men were made, using films from formulas numbers 228 and 230. No burns were obtained from Formula No. 228, which has a total of 17% plasticizers in the dried film; number 230 gave raised redness in the subjects. It would appear that there is an upper limit of an amount of plasticizer content permissible and that Formula Number 230 is slightly beyond this limit of plasticizer. From a standpoint of resistance to mustard gas, Formula 228 appeared more satisfactory.

Other paints comprising a mixture of a cellulose ester and a urea-aldehyde resin and which fall within the scope of the invention follow:

TABLE 3

*Composition of nitrocellulose paints*

| Formula No | 147A | 148E | 149A | 150A | 151 | 169A | 177 |
|---|---|---|---|---|---|---|---|
| Components | Per cent | Per cent | Per cent | Per cent | Per cent | Per cent | Per cent |
| Nitrocellulose (dry basis) | 9.8 | 10.5 | 8.5 | 8.8 | 11.2 | 11.5 | 12.6 |
| Urea-aldehyde resin | 3.9 | 5.8 | 6.4 | 4.7 | 6.3 | 2.7 | 3.6 |
| Tricresyl phosphate | | | | | | | |
| Castor Oil | | | | | | | |
| Synthetic resin (as below)[1] | | | | | | | |
| Mineral oil | | | | | | | |
| Zinc oxide | 3.5 | 4.2 | 3.8 | 6.9 | | 4.5 | 1.2 |
| Titanium oxide mixture (as below)[2] | | | | | | | 4.8 |
| Stearic acid | | | | | | 3.3 | 1.7 |
| Aluminum stearate | 2.0 | 2.3 | 2.1 | 2.3 | | | |
| Ultramarine blue | 0.2 | 0.2 | 0.2 | 0.2 | | | |
| Lampblack | 0.2 | 0.2 | 0.2 | 0.2 | | 0.1 | |
| Aluminum powder | | | | | | 0.1 | 0.2 |
| Solvent (as below) | 80.4 | 76.8 | 78.8 | 76.9 | 82.5 | 77.8 | 75.9 |
| Total | 100.0 | 100.0 | 100.0 | 100.0 | 100.0 | 100.0 | 100.0 |
| Solvent composition, per cent by weight | | | | | | | |
| Ethyl acetate | 18.3 | 20.4 | 16.3 | 17.0 | 20.5 | 22.1 | 24.9 |
| Toluene | 18.3 | 20.4 | 16.3 | 17.0 | 20.5 | 22.1 | 24.9 |
| Butyl acetate | 9.0 | 13.7 | 14.6 | 10.8 | 13.5 | 6.2 | 8.7 |
| Ethylene glycol monoethylether | 44.7 | 45.5 | 42.0 | 43.2 | 45.5 | 26.8 | 24.9 |
| Xylene | 9.7 | | 10.8 | 12.0 | | 22.8 | 16.6 |
| Petroleum spirits | | | | | | | |
| Total | 100.0 | 100.0 | 100.0 | 100.0 | 100.0 | 100.0 | 100.0 |

TABLE 4

| Formula No | 178 | 182 | 183 | 184 | 185A | 188 | 187A |
|---|---|---|---|---|---|---|---|
| Components | Per cent | Per cent | Per cent | Per cent | Per cent | Per cent | Per cent |
| Nitrocellulose (dry basis) | 13.0 | 13.7 | 10.1 | 10.3 | 9.4 | 17.0 | 10.3 |
| Urea-aldehyde resin | 3.5 | 3.6 | 7.2 | 6.6 | 6.0 | | 4.9 |
| Tricresyl phosphate | | | | | | | |
| Castor Oil | | | | | | | |
| Synthetic resin (as below)[1] | | | | | | | |
| Mineral Oil | | | | | 1.1 | | |
| Zinc oxide | 0.8 | 1.2 | 1.2 | 1.2 | 1.1 | 1.2 | 0.5 |
| Titanium oxide mixture (as below)[2] | 5.0 | 3.6 | 3.6 | 3.7 | | 3.7 | 4.9 |
| Stearic acid | 2.5 | 1.7 | 1.7 | 1.7 | 1.6 | 1.7 | 3.7 |
| Aluminum stearate | | | | | 2.2 | | |
| Ultramarine blue | | | | | | | |
| Lampblack | 0.3 | 0.2 | 0.2 | 0.2 | 0.2 | 0.2 | 0.2 |
| Aluminum powder | | | | 0.7 | 0.7 | 0.7 | |
| Solvent (as below) | 74.9 | 76.0 | 76.0 | 75.6 | 77.7 | 75.5 | 75.5 |
| Total | 100.0 | 100.0 | 100.0 | 100.0 | 100.0 | 100.0 | 100.0 |
| Solvent composition, per cent by weight | | | | | | | |
| Ethyl acetate | 26.2 | 27.1 | 20.0 | 20.5 | 18.2 | 33.8 | 20.6 |
| Toluene | 26.2 | 27.1 | 20.0 | 20.5 | 18.2 | 33.8 | 20.6 |
| Butyl acetate | 8.5 | 8.6 | 17.1 | 15.9 | 14.0 | | 11.8 |
| Ethylene glycol monoethylether | 25.8 | 24.6 | 30.3 | 30.1 | 32.4 | 19.4 | 34.0 |
| Xylene | 13.3 | 12.6 | 12.6 | 13.0 | 17.2 | 13.0 | 13.0 |
| Petroleum spirits | | | | | | | |
| Total | 100.0 | 100.0 | 100.0 | 100.0 | 100.0 | 100.0 | 100.0 |

[1] Resin prepared from polyhydric alcohol and phthalic anhydride.
[2] A mixture of titanium oxide, barium sulfate, linseed oil and turpentine.

TABLE 5

| Formula No. | 188B | 196 | 198 | 199 | 201 | 202 | 203A |
|---|---|---|---|---|---|---|---|
| Components | Per cent | Per cent | Per cent | Per cent | Per cent | Per cent | Per cent |
| Nitrocellulose (dry basis) | 10.0 | 9.4 | 9.4 | 9.4 | 9.3 | 9.2 | 8.5 |
| Urea-aldehyde resin | 4.7 | 5.9 | 5.5 | 5.5 | 5.8 | 5.4 | 5.0 |
| Tricresyl phosphate | | 1.3 | | 2.8 | | | 2.5 |
| Castor Oil | | | 2.8 | | | | |
| Synthetic resin (see below)[1] | | | | | 1.3 | 2.7 | |
| Mineral Oil | | | | | | | |
| Zinc Oxide | 0.7 | 1.3 | 1.4 | 1.4 | 1.3 | 1.3 | 1.3 |
| Titanium oxide mixture (as below)[2] | 3.5 | 5.4 | 5.0 | 5.0 | 5.3 | 4.8 | 4.5 |
| Stearic acid | 3.5 | 1.9 | 1.9 | 1.9 | 1.9 | 1.9 | 1.7 |
| Aluminum stearate | | | | | | | |
| Ultramarine blue | | | | | | | |
| Lampblack | 0.2 | 0.3 | 0.3 | 0.3 | 0.3 | 0.3 | 0.3 |
| Aluminum powder | 0.7 | 1.3 | 1.4 | 1.4 | 1.3 | 1.3 | 1.3 |
| Solvent | 76.7 | 73.2 | 72.3 | 72.3 | 73.5 | 73.1 | 74.9 |
| Total | 100.0 | 100.0 | 100.0 | 100.0 | 100.0 | 100.0 | 100.0 |
| *Solvent composition, per cent by weight* | | | | | | | |
| Ethyl acetate | 19.6 | 19.4 | 19.5 | 19.5 | 19.0 | 18.7 | 16.9 |
| Toluene | 19.6 | 19.4 | 19.5 | 19.5 | 19.0 | 18.7 | 16.9 |
| Butyl acetate | 11.0 | 14.5 | 13.7 | 13.7 | 14.3 | 13.4 | 12.0 |
| Ethylene glycol monoethylether | 35.2 | 24.5 | 24.3 | 24.3 | 24.1 | 23.5 | 27.5 |
| Xylene | 14.6 | 22.2 | 23.0 | 23.0 | 21.8 | 22.0 | 26.7 |
| Petroleum Spirits | | | | | 1.8 | 3.7 | |
| Total | 100.0 | 100.0 | 100.0 | 100.0 | 100.0 | 100.0 | 100.0 |

[1] Synthetic resin prepared from a polyhydric alcohol and phthalic anhydride.
[2] A mixture of titanium oxide, linseed oil, turpentine and barium sulfate.

TABLE 6

*Composition of mustard gas impregnable paints containing various plasticizers*

| Formula No. | 236 | 237 | 238 | 239 | 255 | 256 | 263 | 264 | 265 | 266 |
|---|---|---|---|---|---|---|---|---|---|---|
| | Per cent | Per cent | Per cent | Per cent | Per cent | Per cent | Per cent | Per cent | Per cent | Per cent |
| Components | | | | | | | | | | |
| Nitrocellulose (dry basis) | 8.5 | 8.5 | 8.8 | 9.1 | 8.5 | 8.2 | 8.6 | 9.1 | 9.1 | 9.1 |
| Urea-aldehyde resin | 6.1 | 6.1 | 6.3 | 5.2 | 6.1 | 4.7 | 7.4 | 5.2 | 5.2 | 5.2 |
| Aromatic amide-aldehyde resin | | 1.2 | | | | | | | | |
| Tricresyl phosphate | 3.7 | | 3.7 | 3.9 | 1.7 | 1.6 | 1.7 | 2.1 | 2.1 | |
| Butyl phthalyl butyl glycollate | | 2.5 | | | | | 2.5 | 2.6 | 2.6 | 2.6 |
| Castor Oil | | | | | 2.4 | 1.6 | | | | |
| Tung Oil | | | | | | | | | | 2.6 |
| Titanium dioxide containing 8% titanium phthalate | | 4.6 | 5.7 | 7.3 | 5.1 | 2.5 | 4.0 | 6.5 | 2.6 | 2.6 |
| Lampblack | 0.3 | 0.3 | 0.5 | 0.5 | 0.5 | 0.1 | 0.4 | 0.5 | 0.5 | 0.5 |
| Zinc Oxide | 4.6 | | | | | | | | 2.6 | 2.1 |
| Aluminum powder | 1.2 | 1.2 | | | | 4.7 | | | 1.3 | 1.3 |
| Solvent | 75.6 | 75.6 | 75.0 | 74.0 | 75.7 | 76.6 | 75.4 | 74.0 | 74.0 | 74.0 |
| | 100.0 | 100.0 | 100.0 | 100.0 | 100.0 | 100.0 | 100.0 | 100.0 | 100.0 | 100.0 |
| Comprising Ethyl Acetate | 16.9 | 16.9 | 17.5 | 18.4 | 16.9 | 16.2 | 17.3 | 18.4 | 18.4 | 18.4 |
| Toluene | 16.9 | 16.9 | 17.5 | 18.4 | 16.9 | 16.2 | 17.3 | 18.4 | 18.4 | 18.4 |
| Ethylene glycol monoethylether | 8.2 | 8.2 | 23.3 | 14.1 | 8.1 | 9.3 | 9.8 | 7.0 | 7.0 | 7.0 |
| Ethoxy ethyl acetate | 16.1 | 16.1 | 10.0 | 14.1 | | | | 17.6 | 17.6 | 17.6 |
| Ethylene glycol monobutyl ether | 3.2 | 3.2 | | | 21.0 | 18.4 | 9.8 | 17.6 | 14.0 | 14.0 |
| Ethyl lactate | | | | | 6.5 | 6.1 | 13.0 | | | |
| Butyl alcohol | 16.1 | 16.1 | 8.4 | 7.0 | 14.5 | 15.4 | 16.3 | 7.0 | 7.0 | 7.0 |
| Turpentine | | | | | 16.1 | 18.4 | 16.5 | | 17.6 | 17.6 |
| Petroleum diluent (130°–160° C.) | 22.6 | 22.6 | 23.3 | 28.0 | | | | 14.0 | | |
| Total | 100.0 | 100.0 | 100.0 | 100.0 | 100.0 | 100.0 | 100.0 | 100.0 | 100.0 | 100.0 |

Of these, paints numbers 237, 256 and 263 have been found to be the most suitable both from a standpoint of lasting qualities and from a standpoint of resistance to mustard gas. In these qualities they compared favorably with paint number 228.

Another preferred formula which was found to have good properties is the following:

| | Percent |
|---|---|
| Nitrocellulose solution | 48.5 |
| Urea-aldehyde solution | 9 |
| White mineral oil | 2 |
| Aluminum stearate | 1 |
| Zinc oxide | 4.2 |
| Ultaramarine blue | 0.2 |
| Lampblack | 0.1 |
| Ethylene glycol monoethylether | 17.5 |
| Xylene | 17.5 |

The nitrocellulose used was a 25% solution. The urea-aldehyde solution given in the formula was specially prepared from the solid resin and was made up as follows:

| | Percent |
|---|---|
| Urea-aldehyde resin | 25 |
| Ethylene glycol monoethylether | 30 |
| Butyl acetate | 45 |

The composition of the dried film from the above lacquer formula becomes:

| | Percent |
|---|---|
| Nitrocellulose | 55 |
| Urea-aldehyde | 10 |
| White mineral oil | 8.5 |
| Aluminum stearate | 5 |
| Zinc oxide | 20 |
| Ultramarine blue | 1 |
| Lampblack | 0.5 |

The term "urea-aldehyde" as used hereinbefore, is intended to mean primarily urea-formaldehyde. The compounds referred to by the expression "aromatic amide-aldehyde resin" are exemplified by solid resins of the sulfonamide type and may serve as plasticizers. Santolite K is one such resin which is readily available on the market. This resin is soft, sticky, is compatible with cellulose esters and ethers and has the qualities of both the sulfonamide and alkyd types of resins.

The combinations of ingredients herein described have been found to form excellent impermeable coatings for fabrics, such as canvas or cotton ducks. Such coatings remain flexible and do not develop cracks. Fabrics thus coated find use as gas mask facepieces, protective capes or coveralls, and as covers to protect various equipment such as airplanes from mustard gas. The word "paints" as used herein is intended to include such coatings as well as the usual paints.

The invention herein described is not limited to the precise details herein disclosed, since variations therein may be made by those skilled in the art without exceeding the scope of the appended claim.

We claim:

A mustard gas-resistant paint comprising in admixture approximately nitrocellulose 8.2%, a urea formaldehyde resin 4.7%, tricresyl phosphate 1.6%, castor oil 1.6%, titanium dioxide containing 8% titanium phthalate 2.5%, lampblack 0.1%, aluminum powder 4.7% and 76.6% of a solvent comprising ethyl acetate 16.2%, toluene 16.2%, ethylene glycol monoethyl ether 9.3%, ethylene glycol monobutylether 18.4%, ethyl lactate 6.1%, butyl alcohol 15.4%, and turpentine 18.4%.

HARRY SCHERR.
GLENN A. LITTLE.

REFERENCES CITED

The following references are of record in the file of this patent:

UNITED STATES PATENTS

| Number | Name | Date |
|---|---|---|
| 928,235 | Montlord | July 13, 1909 |
| 1,564,664 | Gardner | Dec. 8, 1925 |
| 1,618,483 | Shipley et al. | Feb. 22, 1927 |
| 1,672,848 | Lanter | June 5, 1928 |
| 1,898,754 | Belfit | Feb. 21, 1933 |
| 1,902,337 | Neubauer | Mar. 21, 1933 |
| 2,038,836 | Gardner | Apr. 28, 1936 |
| 2,208,290 | Glycofrides | July 16, 1940 |
| 2,301,959 | Lanning | Nov. 17, 1942 |
| 2,374,603 | Kolar | Apr. 24, 1945 |

OTHER REFERENCES

"Plasticizers & Resins"; pub. 1940 by Monsanto Chem. Co., St. Louis, pp. 28–31.